(12) United States Patent
Yu et al.

(10) Patent No.: US 11,469,614 B1
(45) Date of Patent: Oct. 11, 2022

(54) MINIATURE ENERGY HARVESTING WIRELESS ALTERNATING CURRENT SENSOR MODULE

(71) Applicants: Wenli Yu, Pleasanton, CA (US); Liangcai Tan, Dublin, CA (US)

(72) Inventors: Wenli Yu, Pleasanton, CA (US); Liangcai Tan, Dublin, CA (US)

(73) Assignee: Archimedes Controls Corp., Pleasanton, CA (US)

( * ) Notice: Subject to any disclaimer, the term of this patent is extended or adjusted under 35 U.S.C. 154(b) by 0 days.

(21) Appl. No.: 17/647,464

(22) Filed: Jan. 9, 2022

(51) Int. Cl.
*H02J 50/00* (2016.01)
*H02J 50/20* (2016.01)

(52) U.S. Cl.
CPC ............ *H02J 50/001* (2020.01); *H02J 50/20* (2016.02)

(58) Field of Classification Search
CPC ........ B60L 5/005; B60L 53/12; B60L 53/122; B60L 53/124; B60L 53/126; H01F 27/006; H01F 38/14; H02G 7/16; H02J 5/00; H02J 5/005; H02J 7/00; H02J 7/0042; H02J 7/0044; H02J 7/0045; H02J 7/025; H02J 17/00; H02J 50/00; H02J 50/001; H02J 50/005; H02J 50/05; H02J 50/10; H02J 50/12; H02J 50/15; H02J 50/20; H02J 50/23; H02J 50/27; H02J 50/30; H02J 50/40; H02J 50/402; H02J 50/50; H02J 50/502; H02J 50/60; H02J 50/70; H02J 50/80; H02J 50/90; H04B 5/0037
USPC ........................................................ 307/104
See application file for complete search history.

(56) References Cited

U.S. PATENT DOCUMENTS

| 2019/0037507 | A1* | 1/2019 | Shamir | ................ G01R 21/133 |
| 2020/0381945 | A1* | 12/2020 | Wang | ..................... H02J 50/90 |
| 2021/0111561 | A1* | 4/2021 | Blair | .................... H02J 50/001 |

* cited by examiner

*Primary Examiner* — Quan Tra

(57) ABSTRACT

A small size, energy harvesting, long distance wireless AC sensor module. The sensor module includes an electromagnetic energy harvesting method that supplies and manages power to the sensor. Therefore, the sensor module does not rely on wired power or battery to run. The sensor also includes a low power wireless transmitter that has transmission frequency of sub-1 GHz and effective transfer distance of more than 100 meters, more than 150 meters, more than 200 meters and up to 250 meters.

It has small size preferably having a size of less than 68 mm long by 33 mm wide by 21 mm thick, less than 50 grams. Thanks to the wireless and energy harvesting features, the sensor is very easy to install. Users just need to clamp sensors to the subject electrical lines, and then the data will be sent to data gateways automatically.

5 Claims, 3 Drawing Sheets

MINIATURE ENERGY HARVESTING WIRELESS ALTERNATING CURRENT SENSOR MODULE

FIELD OF THE INVENTION

The present invention relates to sensors and measurement and, more particularly, to wireless alternating current sensors.

BACKGROUND OF THE INVENTION

Alternating current (AC) measurement is essential for electrical and energy management systems. These systems usually need large number of AC sensors (also called current transformer) in real time measurement. There are two types of AC sensors for these systems, wired or wireless. Conventional sensors are wired, which rely on physical wires to provide continuous power supply and transmit data to the data acquisition system. However, wired sensors and systems take a long time for installation and their reliability is dependent on a power supply. There are a small number of battery powered wireless AC sensors in the market. They utilize wireless technologies like WIFI, ZigBee or sub-1G MHz systems to transmit data. These wireless sensors have relatively short transmission distances, from 20 meters to 100 meters at open space. Their battery life is also typically short from 1 day to 5 years. Although there are a couple of products that claim that their battery life is more than 10 years, these sensors are bulky and their transmission distance is short.

SUMMARY OF THE INVENTION

Described is a miniature energy harvesting wireless alternating current sensor module. The sensor module includes an electromagnetic energy harvesting method that supplies and manages power to the sensor. Therefore, the sensor module does not rely on wired power or battery to run. The sensor also includes a low power wireless transmitter that has transmission frequency of sub-1 GHz and effective transfer distance of more than 100 meters, more than 150 meters, more than 200 meters and up to 250 meters.

It is contained in a small size preferably having a size of less than 68 mm long by 33 mm wide by 21 mm thick, less than 50 grams. Thanks to the wireless and energy harvesting features, the sensor is very easy to install. Users just need to clamp sensors to the subject electrical lines, and then the data will be sent to data gateways automatically and continuously without any power source like battery or DC power input.

The present invention aims to solve these problems by develop a small size, energy harvesting, long distance wireless AC sensor module.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DETAILED DESCRIPTION

The present invention is directed to a small size, energy harvesting, long distance wireless AC sensor module. The sensor module includes an electromagnetic energy harvesting method that supplies and manages power to the sensor. Therefore, the sensor module does not rely on wired power or battery to run. The sensor also includes a low power wireless transmitter that has transmission frequency of sub-1 GHz and effective transfer distance of more than 100 meters, more than 150 meters, more than 200 meters and up to 250 meters.

It has small size preferably having a size of less than 68 mm long by 33 mm wide by 21 mm thick, less than 50 grams. Thanks to the wireless and energy harvesting features, the sensor is very easy to install. Users just need to clamp sensors to the subject electrical lines, and then the data will be sent to data gateways automatically and continuously without any power source like battery or DC power input.

Figure 1:
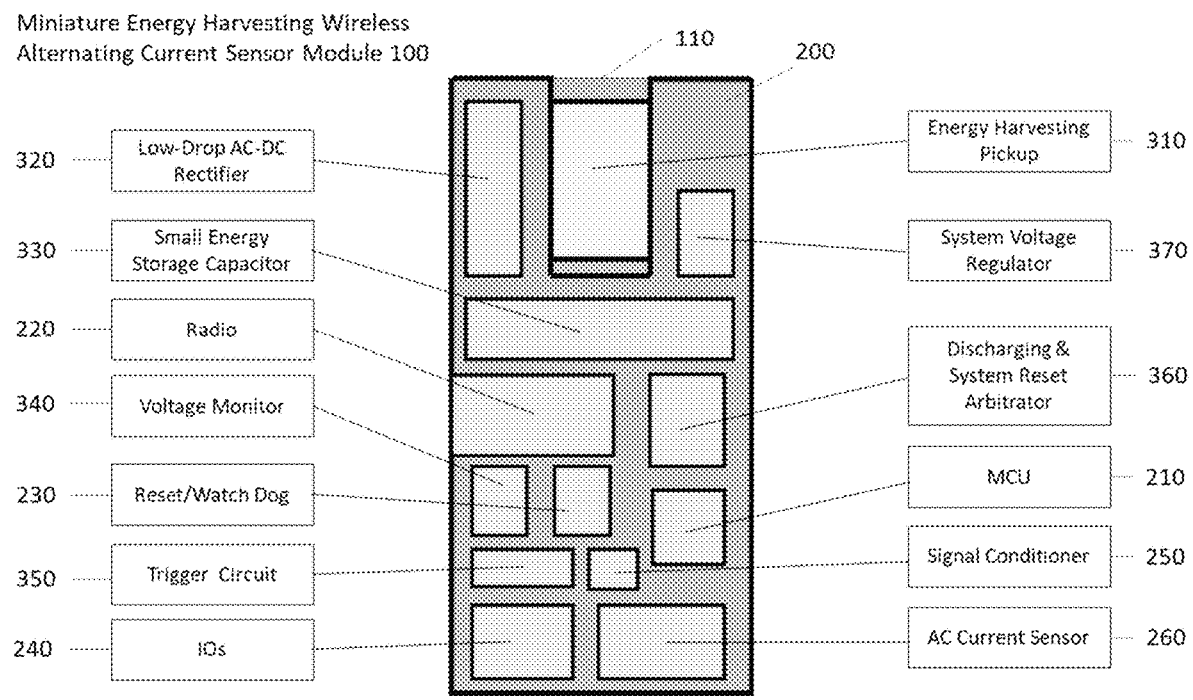
FIG. 1 is a perspective view of a miniature energy harvesting wireless alternating current sensor module.

FIG. 1 is a perspective view of a miniature energy harvesting wireless alternating current sensor module 100. The module include a shell 110, a printed circuit board 200, a microcontroller unit (MCU) 210, a radio wireless module 220, a reset and watch dog chip 230, a few signal inputs and outputs (IOs) 240, a signal conditioner 250, an AC current sensor 260, an energy harvesting pickup area 310, a low-drop AC to DC (direct current) rectifier 320, a small energy storage capacitor 330, a voltage monitor 340, a trigger circuit 350, a discharging and system reset arbitrator 360 and a system voltage regulator 370.

The shell 110 may be formed by two plastic pieces, for holding all the components of the sensor module. It may have a size of about 68 mm×33 mm×21 mm. Preferably, the sensor module 100 is less than 80 mm in any one dimension, preferably, less than 70 mm, preferably less 60 mm. Preferably, the sensor module has a thickness of less than 30 mm, less than 20 mm, or less than 15 mm.

Figure 2:
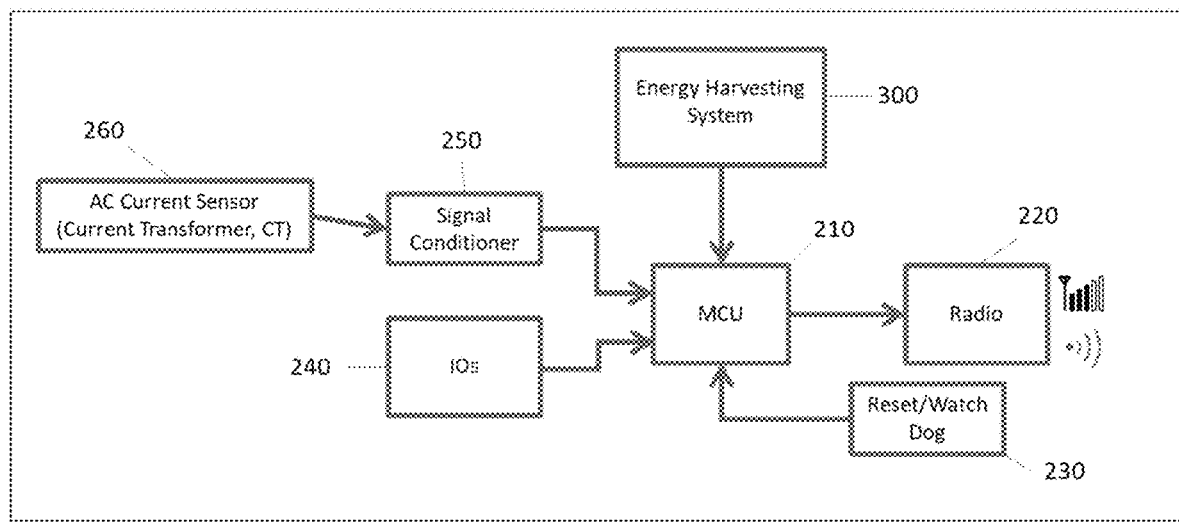
FIG. 2 is a detail view of a block diagram the printed circuit board.

A detail view of a block diagram of the printed circuit board 200 is shown in FIG. 2. The printed circuit board 200 may connect all the electronic components of the sensor module together and may be rigidly screwed to said shell 110.

The printed circuit board 200 can include one or more MCUs 210. The MCU 210 is an ARM-based microcontroller unit, for processing all the input and output requests, and transmitting data, rigidly soldered to said printed circuit board 200. An example of the processor 210 is a low power microcontroller such as TI MSP430 series.

The circuit board 200 also includes a radio wireless module 220. The wireless module 220 may have an antenna, with frequency of sub-1 GHz, with transmission distance of up to 250 meters at open space, for transmitting the data to the sensor controller or gateway. Examples of wireless module 220 are high performance wireless modules such as Anaren Integrated Radio (AIR) A1101R04C with Antenna 66089-0406 and AIR A110LR09C with Antenna 66089-8906. The wireless module 220 may be rigidly soldered to said printed circuit board 200.

The circuit board 200 also includes a reset and watch dog chip 230. The reset and watch dog chip 230 is a microchip acting as a watch dog to reset the MCU 210 when the MCU 210 enters abnormal states, rigidly soldered to said printed circuit board 200. Examples of the reset and watch dog chip 230 are BU42 series supervisory circuits from ROHM Semiconductor.

The circuit board 200 also includes many IOs 240. The IOs 240 are General Purpose Inputs and Outputs (GPIOs) wired to the MCU 210 for connecting all the electronic elements to the MCU 210.

The circuit board 200 also includes a signal conditioner 250. The signal conditioner 250 is a signal conditioning circuit to convert the sensed AC current information from the sensor into the electrical signal. The signal conditioner 250 is made of a resistor-capacitor (RC) filter and a Zener diode which is a type of diode that permits current not only in the forward direction like a normal diode, but also in the reverse direction if the voltage is larger than the breakdown voltage known as "Zener voltage". The signal conditioner 250 may be rigidly soldered to said print circuit board 200.

The circuit board 200 also includes an AC current sensor 260. The AC current sensor 260 is an electromagnetic (EM) current transformer (CT) which is clamped to subject electrical wires to convert the electric current to a voltage signal. The subject electrical wires for buildings or any other facilities may have maximum currents of 60A, 100A, or 200A. The AC current sensor 260 may be connected to the signal conditioner 250 through wire, and may be rigidly attached to said shell 110 without direct physical contact to electrical power lines to be measured for AC current flow.

Figure 3:
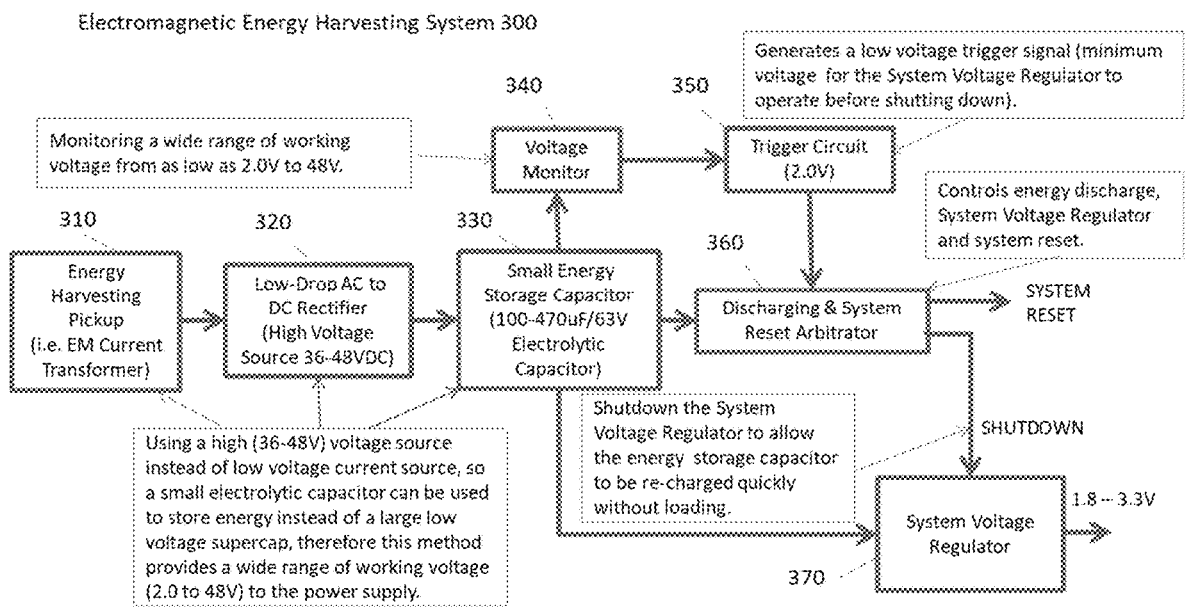
FIG. 3 is a detail view of a workflow of the electromagnetic energy harvesting system.

The circuit board 200 also includes an energy harvesting system 300. The energy harvesting system 300 is the power supply system for the miniature energy harvesting wireless alternating current sensor module 100. It picks up the energy from the electromagnetic current transformer 310 which is the same component as AC current sensor 260. The energy is then transferred to usable power supply for the entire sensor module. The energy harvesting system 300 is unique as it includes an energy harvesting method which integrates a combination of electronic components and a flow of connections as shown in FIG. 3. The energy harvesting system 300 ensure a continuous power supply to the sensor module without relying on battery or external power supply. The energy harvesting system 300 may be rigidly soldered to the print circuit board 200.

The components of the energy harvesting system 300 are energy harvesting pickup 310, low-drop AC to DC rectifier 320, small energy storage capacitor 330, voltage monitor 340, trigger circuit 350, discharging and system reset arbitrator 360 and system voltage regulator 370. These components are also shown in FIG. 1.

The energy harvesting pickup 310 is the same component as the AC current sensor 260 but they serve for different purposes as indicated in their names. The energy harvesting pickup 310 is an electromagnetic (EM) current transformer (CT) which is clamped to subject electrical wires to convert the current to voltage signal.

The low-drop AC to DC rectifier 320 is a rectifier with high voltage source 36V to 48V DC. It converts the AC voltage to DC voltage. Examples of low-drop AC to DC rectifier 320 are KMB2 series rectifiers from SMC Diode Solutions. The low-drop AC to DC rectifier 320 may be rigidly soldered to said printed circuit board 200.

The small energy storage capacitor 330 is a 100-470 uF/63V electrolytic capacitor for storing the energy. It is a key component for the energy harvesting system to work. An example of small energy storage capacitor 330 is a 220 uF, 63V capacitor. The small energy storage capacitor 330 may be rigidly soldered to said printed circuit board 200.

The voltage monitor 340 is a voltage monitor chip, which monitors a wide range of working voltage from as low as 2.0V to 48V. Examples of voltage monitor 340 are LT3060 series voltage regulators from Analog Devices Inc. The voltage monitor 340 may be rigidly soldered to said print circuit board 200.

The trigger circuit 350 is a microchip, which generates a low voltage trigger signal when the system power is lower than the minimum voltage of 2.0V required for the system voltage regulator 370 to operate before shutting down. Examples of the trigger circuit 350 are BU43 series supervisory circuits from ROHM Semiconductor. The trigger circuit 350 may be rigidly soldered to said printed circuit board 200.

The discharging and system reset arbitrator 360 is a voltage regulator chip, which controls energy discharge, system voltage regulator and system reset. Examples of discharging and system reset arbitrator 360 are LT3060 series voltage regulators from Analog Devices Inc. The discharging and system reset arbitrator 360 may be rigidly soldered to said printed circuit board 200.

The system voltage regulator 370 is a voltage regulator chip, which supplies power to the system in the range of 1.8V to 3.3V. Examples of system voltage regulator 370 are LT3060 series voltage regulators from Analog Devices Inc. The system voltage regulator 370 may be rigidly soldered to said print circuit board 200.

A detail view of a workflow of the energy harvesting system is shown in FIG. 3. As shown in FIG. 3, the energy harvesting pickup 310 will pick up the energy and send it to the low-drop AC to DC rectifier 320. After the AC signal is converted to DC it will be stored in the small energy storage capacitor 330. The energy harvesting pickup 310, the low-drop AC to DC rectifier 320 and the small energy storage capacitor 330 use a high (36V to 48V) voltage source instead of low voltage source, so a small sized and high voltage rated electrolytic capacitor can be used to store energy instead of a large sized and low voltage supercap. Thus this method provides a wide range of working voltage (2.0V to 48V) to the power supply. The stored energy will be sent to system voltage regulator 370 for providing system 1.8V to 3.3V power. Meanwhile the store energy will also be monitored by the voltage monitor 340 and the discharging and system reset arbitrator 360 to trigger system reset or shutdown. The voltage monitor 340 can monitor a wide range of working voltage from as low as 2.0V to 48V. Once the voltage is lower than 2.0V, the trigger circuit 350 will generate a low voltage trigger signal and send it to the discharging and system reset arbitrator 360. The discharging and system reset arbitrator 360 then activates the system shutdown which shuts down the system voltage regulator 370 to allow the small energy storage capacitor 330 to be recharged quickly without loading. If the stored energy voltage is lower than 2.5V the discharging and system reset arbitrator 360 activates the system reset as the power is too low to maintain a health run for the system.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A miniature energy harvesting wireless alternating current sensor module using the energy harvesting method and system described in FIG. 3 for measuring alternating current amperage, and wirelessly transmitting the data to one or more sensor controller group(s) connected in a mesh-shaped network, comprising:
   a printed circuit board holding electronic components on the board;
   a wireless module with a transmission frequency of less than 435 HHz and more than 430 MHz, with a transmission distance of more than 100 meters and less than 250 meters;
   an ARM-based microcontroller unit processor with 16 KB flash memory, for transmitting data from the wireless sensor module;
   an alternating current sensor, for converting alternating current to alternating current voltage signal and send alternating current voltage signal to a signal conditioner;
   a signal conditioner, for converting alternating current voltage signal to direct current voltage signal and send it to the microcontroller for data processing.

2. The miniature energy harvesting wireless alternating current sensor module of claim 1, wherein the sensor module runs with harvested energy by the energy harvesting method and system described in FIG. 3 so it runs without external power source or battery.

3. The miniature energy harvesting wireless alternating current sensor module of claim 1, wherein the module is less than 68 mm in any one dimension.

4. The miniature energy harvesting wireless alternating current sensor module of claim 1, wherein the module is less than 33 mm in any one dimension.

5. The miniature energy harvesting wireless alternating current sensor module of claim 1, wherein the module has a thickness of less than 21 mm.

* * * * *